(12) United States Patent
Aoyagi et al.

(10) Patent No.: US 10,304,159 B2
(45) Date of Patent: May 28, 2019

(54) SUPERIMPOSED DISPLAY METHOD AND SUPERIMPOSED DISPLAY APPARATUS

(71) Applicant: FUJITSU LIMITED, Kawasaki-shi, Kanagawa (JP)

(72) Inventors: Tomohiro Aoyagi, Toshima (JP); Yojiro Numata, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/291,161

(22) Filed: Oct. 12, 2016

(65) Prior Publication Data
US 2017/0132752 A1    May 11, 2017

(30) Foreign Application Priority Data
Nov. 6, 2015   (JP) .................................. 2015-218318

(51) Int. Cl.
*G06T 3/00* (2006.01)
*G06T 17/00* (2006.01)
(Continued)

(52) U.S. Cl.
CPC ............ *G06T 3/0075* (2013.01); *G06T 7/001* (2013.01); *G06T 17/00* (2013.01); *G06T 19/006* (2013.01); *G06T 19/20* (2013.01); *G06T 3/20* (2013.01); *G06T 3/40* (2013.01); *G06T 3/60* (2013.01); *G06T 2207/10004* (2013.01);
(Continued)

(58) Field of Classification Search
CPC ......... G06T 7/33; G06T 7/0004; G06T 17/00; G06T 19/006; G06T 3/0075; G06T 7/30
See application file for complete search history.

(56) References Cited

U.S. PATENT DOCUMENTS

2001/0040995 A1* 11/2001 Takada ............... G06K 9/00476
382/152
2003/0004645 A1    1/2003 Kochi
(Continued)

FOREIGN PATENT DOCUMENTS

DE    2012003256        8/2013
DE    2012003256 A1    8/2013
(Continued)

OTHER PUBLICATIONS

Extended European Search Report dated Aug. 18, 2017 for corresponding European Patent Application No. 16194556.3, 10 pages.
(Continued)

*Primary Examiner* — Yu Chen
(74) *Attorney, Agent, or Firm* — Fujitsu Patent Center

(57) ABSTRACT

A computer displays a plurality of edge lines extracted from a shot image of a spatial structure that has been shot by an image shooting apparatus, and a plurality of ridge lines included in a model image represented by model information of the spatial structure, in a manner such that the edge lines and the ridge lines are selectable. Then, the computer accepts a selection instruction indicating an edge line and a ridge line of an overlay target. Finally, in accordance with the accepted selection instruction, the computer displays a superimposition image in which the model image has been superimposed onto the shot image in a manner such that the edge line and the ridge line of the overlay target overlap each other.

8 Claims, 25 Drawing Sheets

(51) Int. Cl.
  *G06T 19/20* (2011.01)
  *G06T 19/00* (2011.01)
  *G06T 7/00* (2017.01)
  *G06T 3/20* (2006.01)
  *G06T 3/40* (2006.01)
  *G06T 3/60* (2006.01)

(52) U.S. Cl.
  CPC .............. *G06T 2207/20092* (2013.01); *G06T 2207/20212* (2013.01); *G06T 2207/30164* (2013.01); *G06T 2219/2012* (2013.01)

(56) References Cited

U.S. PATENT DOCUMENTS

| | | | |
|---|---|---|---|
| 2004/0052417 A1* | 3/2004 | Lee | G06T 7/001 382/199 |
| 2006/0044308 A1* | 3/2006 | Akutsu | G06T 19/00 345/423 |
| 2006/0050087 A1* | 3/2006 | Tanimura | G06F 3/011 345/629 |
| 2006/0267980 A1* | 11/2006 | Onoue | G06F 17/30271 345/420 |
| 2007/0146325 A1* | 6/2007 | Poston | G06F 3/0317 345/163 |
| 2007/0182739 A1* | 8/2007 | Platonov | G06T 15/20 345/427 |
| 2007/0216681 A1* | 9/2007 | Nishida | G06F 17/50 345/427 |
| 2009/0010489 A1* | 1/2009 | Appel | G06T 7/0004 382/100 |
| 2009/0039263 A1* | 2/2009 | Matsuoka | G03F 7/70616 250/311 |
| 2010/0232647 A1 | 9/2010 | Fujieda et al. | |
| 2011/0050686 A1* | 3/2011 | Nojima | G06F 3/04815 345/419 |
| 2012/0001908 A1* | 1/2012 | Kikuta | G06F 17/50 345/419 |
| 2012/0243796 A1 | 9/2012 | Saito | |
| 2012/0249820 A1* | 10/2012 | Beauchemin | G06T 7/001 348/222.1 |
| 2013/0050207 A1 | 2/2013 | Lin et al. | |
| 2013/0207965 A1 | 8/2013 | Hori | |
| 2013/0253693 A1* | 9/2013 | Matsubara | G05B 19/4093 700/159 |
| 2014/0098091 A1 | 4/2014 | Hori | |
| 2015/0161821 A1* | 6/2015 | Mazula | G06T 19/006 345/419 |
| 2015/0330881 A1* | 11/2015 | Niwa | G06F 17/5018 73/788 |
| 2016/0339724 A1* | 11/2016 | Munenaka | B41J 25/003 |

FOREIGN PATENT DOCUMENTS

| | | | |
|---|---|---|---|
| EP | 0593183 A2 * | 4/1994 | G06T 7/001 |
| EP | 1993072 A1 | 11/2008 | |
| JP | 11-239989 | 9/1999 | |
| JP | 2002-352224 | 12/2002 | |
| JP | 2005-339127 | 12/2005 | |
| JP | 2010-211746 | 9/2010 | |
| JP | 2011-180066 | 9/2011 | |
| JP | 2012-203458 | 10/2012 | |
| JP | 2013-167481 | 8/2013 | |
| WO | 2012173141 | 12/2012 | |

OTHER PUBLICATIONS

EPSR—Partial European Search Report dated Apr. 13, 2017 for corresponding European Patent Application No. 16194556.3.

Extended European Search Report dated May 29, 2018 for corresponding European Patent Application No. 18157139.9, 11 pages Schoenfelder, Ralph et al., "Augmented Reality for Industrial Building Acceptance", IEEE Virtual Reality 2008, Piscataway, NJ, USA, Mar. 8, 2008, pp. 83-90, XP031340003.

Imperoli, Marco et al., "D2CO: Fast and Robust Registration of 3D Textureless Objects Using the Directional Chamfer Distance", Computer Vision Systems—10th International Conference, ICVS 2015. Proceedings: LNCS 9163 Springer International Publishing Cham, Switzerland, Jul. 9, 2015, pp. 316-328, XP002781025.

Zhang, Xi et al., "Alignment of 3D Building Models with Satellite Images Using Extended Chamfer Matching", 2014 IEEE Conference on Computer Vision and Pattern Recognition Workshops, Jun. 23, 2014, pp. 746-753, XP032649673.

Duraisamy, Prakash et al., "Coarse automated registration of visual imagery with three-dimensional light detection and ranging models", Journal of Electronic Imaging, SPIE—International Society for Optical Engineering, US, vol. 22, No. 3, Jul. 1, 2013, pp. 033035-1-033035-10, XP060026283.

* cited by examiner

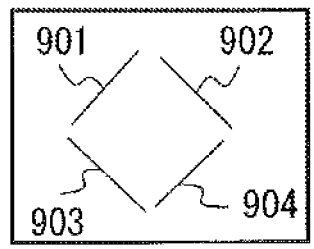
F I G. 9

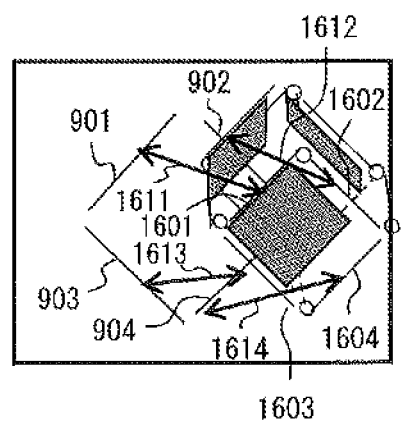
F I G. 18

| EDGE LINE ID | RIDGE LINE ID | PRIORITY |
|---|---|---|
| E1 | L1 | 1 |
| E2 | L2 | 2 |
| E3 | L3 | 3 |
| E4 | L4 | 4 |

FIG. 19

SUPERIMPOSED DISPLAY METHOD AND SUPERIMPOSED DISPLAY APPARATUS

CROSS-REFERENCE TO RELATED APPLICATION

This application is based upon and claims the benefit of priority of the prior Japanese Patent Application No. 2015-218318, filed on Nov. 6, 2015, the entire contents of which are incorporated herein by reference.

FIELD

The embodiments discussed herein are related to a superimposed display method and a superimposed display apparatus.

BACKGROUND

In constructing spatial structures such as steel towers and bridges in the iron & steel industry, a component processing process, a welding process, and a tentative assembly process may be performed in steps from Computer-Aided-Design-based (CAD-based) designing to on-site assembling. Following the tentative assembly process, components are shipped to a construction site so as to perform on-site assembling. In the component processing process, steel components of a spatial structure are processed; in the welding process, steel components are tentatively welded, the tentative welding is diagnosed, and regular welding is performed; in the tentative assembly process, tentative assembling, disassembling, paint finishing, and diagnoses are performed.

Such a spatial structure is often one large item. Accordingly, diagnoses in the welding process and the tentative assembly process are frequently performed through visual checking of comparing a tentatively welded or painted object with a three-dimensional CAD model created in a designing process.

When a fault in the welding process is overlooked in a diagnosis and is found during a tentative assembly task, a returning operation from the tentative assembly process to the component processing process occurs. When a fault in the tentative assembly process is overlooked in a diagnosis and is found during an on-site assembling task, a returning operation from the on-site assembling to the component processing process occurs.

A technique for superimposing and displaying an image of an object and an image of a three-dimensional model is also known in the field of image processing (see, for example, patent documents 1-3).

Patent Document 1: Japanese Laid-open Patent Publication No. 2010-211746
Patent Document 2: Japanese Laid-open Patent Publication No. 11-239989
Patent Document 3: International Publication Pamphlet No. WO 2012/173141

SUMMARY

According to an aspect of the embodiments, a computer executes the following process.

(1) The computer displays a plurality of edge lines extracted from a shot image of a spatial structure that has been shot by an image shooting apparatus and a plurality of ridge lines included in a model image represented by model information of that spatial structure, in a manner such that the edge lines and the ridge lines are selectable.

(2) The computer accepts a selection instruction indicating an edge line and a ridge line of an overlay target.

(3) In accordance with the accepted selection instruction, the computer displays a superimposition image in which the model image has been superimposed onto the shot image in a manner such that the edge line and the ridge line of the overlay target overlap each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates edge lines;
FIG. 18 illustrates four combinations of edge and ridge lines;
FIG. 19 illustrates combination information.

DESCRIPTION OF EMBODIMENTS

The following describes embodiments in detail with reference to the drawings.

Digitization of diagnostic methods has not been developed for the conventional task of constructing spatial structures. Accordingly, to prevent a returning operation from occurring in tentative assembling and on-site assembling, a certain task time is spend on visual checking of comparing an object and a three-dimensional CAD model. An increase in the number of components leads to more portions of a spatial structure to be diagnosed, thereby extending the task time for visual checking. In addition, it is not easy to develop a skilled operator who can conduct accurate analyses in a short time, and several years may be required to develop such a skilled operator.

Such problems are not limited to diagnoses in tasks of constructing steel towers, bridges, or the like, and arise in a checking task of comparing another spatial structure and a model represented by model information of that structure.

Figure 1:
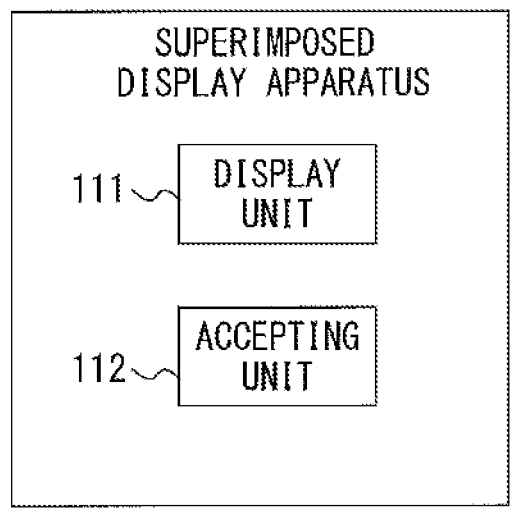
FIG. 1 is a functional configuration diagram of a first superimposed display apparatus.

FIG. 1 illustrates an exemplary functional configuration of a first superimposed display apparatus. A superimposed display apparatus 101 in FIG. 1 includes a display unit 111 and an accepting unit 112.

Figure 2:
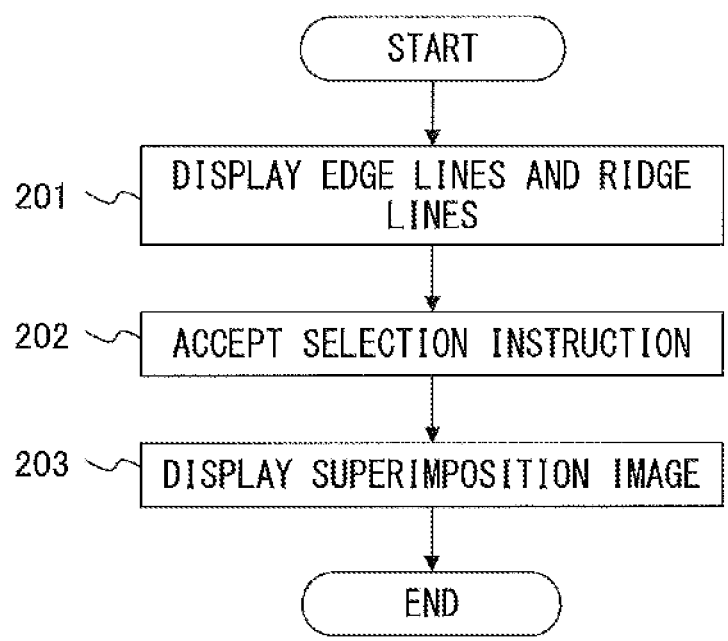
FIG. 2 is a flowchart of a first superimposed display process.

FIG. 2 is a flowchart illustrating an example of a first superimposed display process performed by the superimposed display apparatus 101 from FIG. 1. The display unit 111 displays edge lines extracted from a shot image of a spatial structure that has been shot by an image shooting apparatus and ridge lines included in a model image represented by model information of that spatial structure, in a manner such that those lines are selectable (step 201).

The accepting unit 112 accepts a selection instruction indicating an edge line and a ridge line of an overlay target (step 202). In accordance with the selection instruction accepted by the accepting unit 112, the display unit 111 displays a superimposition image in which the model image has been superimposed onto the shot image in a manner such that the edge line and the ridge line of the overlay target overlap each other.

The superimposed display apparatus 101 in FIG. 1 can improve the efficiency of a checking task of comparing a spatial structure and a model represented by model information.

Figure 3:
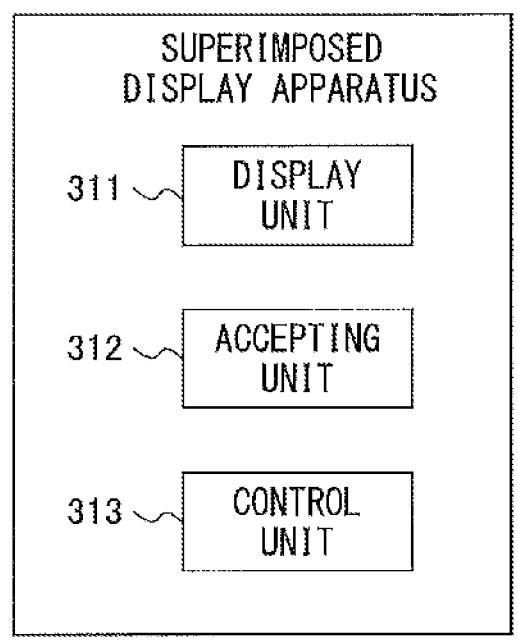
FIG. 3 is a functional configuration diagram of a second superimposed display apparatus.

FIG. 3 illustrates an exemplary functional configuration of a second superimposed display apparatus. A superimposed display apparatus 301 in FIG. 3 includes a display unit 311, an accepting unit 312, and a control unit 313.

Figure 4:
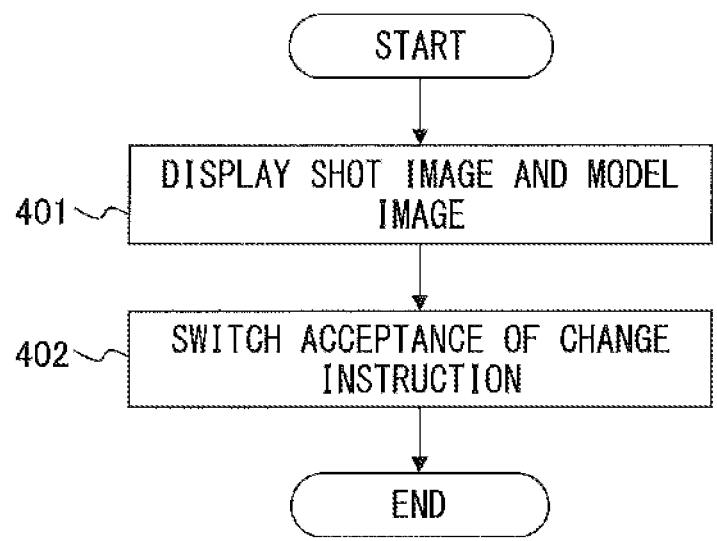
FIG. 4 is a flowchart of a second superimposed display process.

FIG. 4 is a flowchart illustrating an example of a second superimposed display process performed by the superimposed display apparatus 301 from FIG. 3. The display unit 311 displays a shot image of a spatial structure that has been shot by an image shooting apparatus, and a model image represented by model information of that spatial structure (step 401).

Before and after the accepting unit 312 accepts a superimposed display instruction, the control unit 313 switches between the rule that separate change instructions be accepted for the shot image and the model image, and the rule that a common change instruction be accepted for the shot image and the model image (step 402). The superimposed display instruction is an instruction to display a superimposition image in which the model image has been superimposed onto the shot image in a manner such that a reference position on the shot image and a reference position on the model image overlap each other. The change instruction is an instruction to enlarge, reduce, move, or rotate the shot image or the model image.

The superimposed display apparatus 301 in FIG. 3 can improve the efficiency of a checking task of comparing a spatial structure and a model represented by model information.

Figure 5:
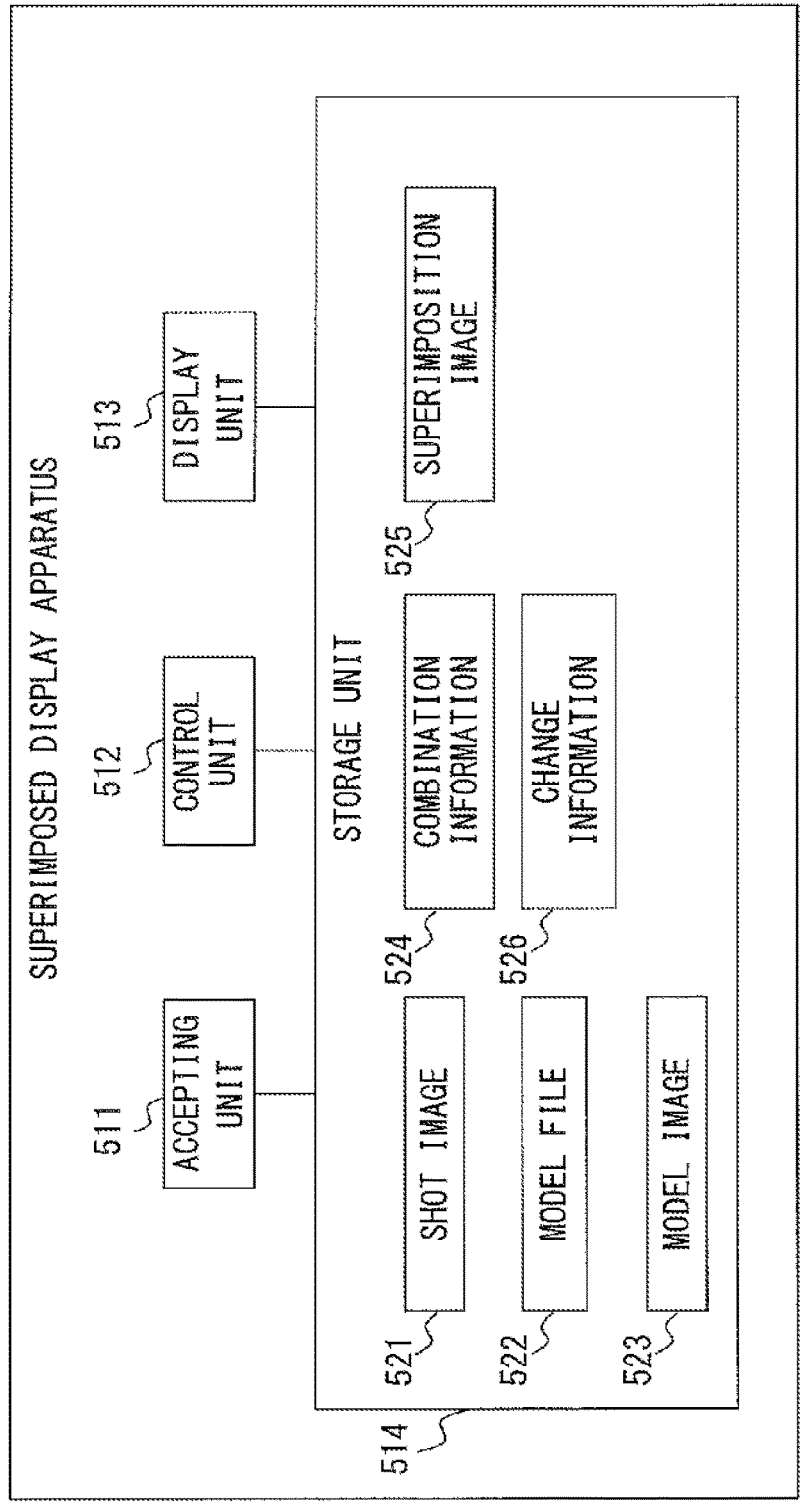
FIG. 5 is a functional configuration diagram illustrating a specific example of a superimposed display apparatus.

FIG. 5 illustrates a specific example of the superimposed display apparatus 101 in FIG. 1 or the superimposed display apparatus 301 in FIG. 3. A superimposed display apparatus 501 in FIG. 5 includes an accepting unit 511, a control unit 512, a display unit 513, and a storage unit 514. The accepting unit 511 corresponds to the accepting unit 112 in FIG. 1 and the accepting unit 312 in FIG. 3; the control unit 512, the control unit 313 in FIG. 3; the display unit 513, the display unit 111 in FIG. 1 and the display unit 311 in FIG. 3.

The storage unit 514 stores one or more shot images 521, one or more model files 522, a model image 523, combination information 524, a superimposition image 525, and change information 526. The shot image 521 is an image of a spatial structure shot by an image shooting apparatus such as a camera, and may include information indicating an angle of view of the image shooting apparatus. The model file 522 is model information representing a three-dimensional CAD model of the spatial structure, and includes vertex information of a plurality of vertexes included in the three-dimensional CAD model and line segment information of a plurality of line segments.

The model image 523 is an image of a three-dimensional CAD model represented by the model file 522. Combination information 524 indicates a combination of an edge line and a ridge line of the overlay target that have been selected by an operator. The superimposition image 525 is an image in which the model image 523 has been superimposed onto the shot image 521. Change information 526 indicates whether to accept separate change instructions for the shot image 521 and the model image 523, or whether to accept a common change instruction for the shot image 521 and the model image 523, the change instructions being instructions to enlarge, reduce, move, or rotate an image.

The superimposed display apparatus 501 may be a portable terminal apparatus such as a tablet, a notebook PC, or a smartphone, or may be a fixed terminal apparatus such as a desktop PC.

Figure 6A:
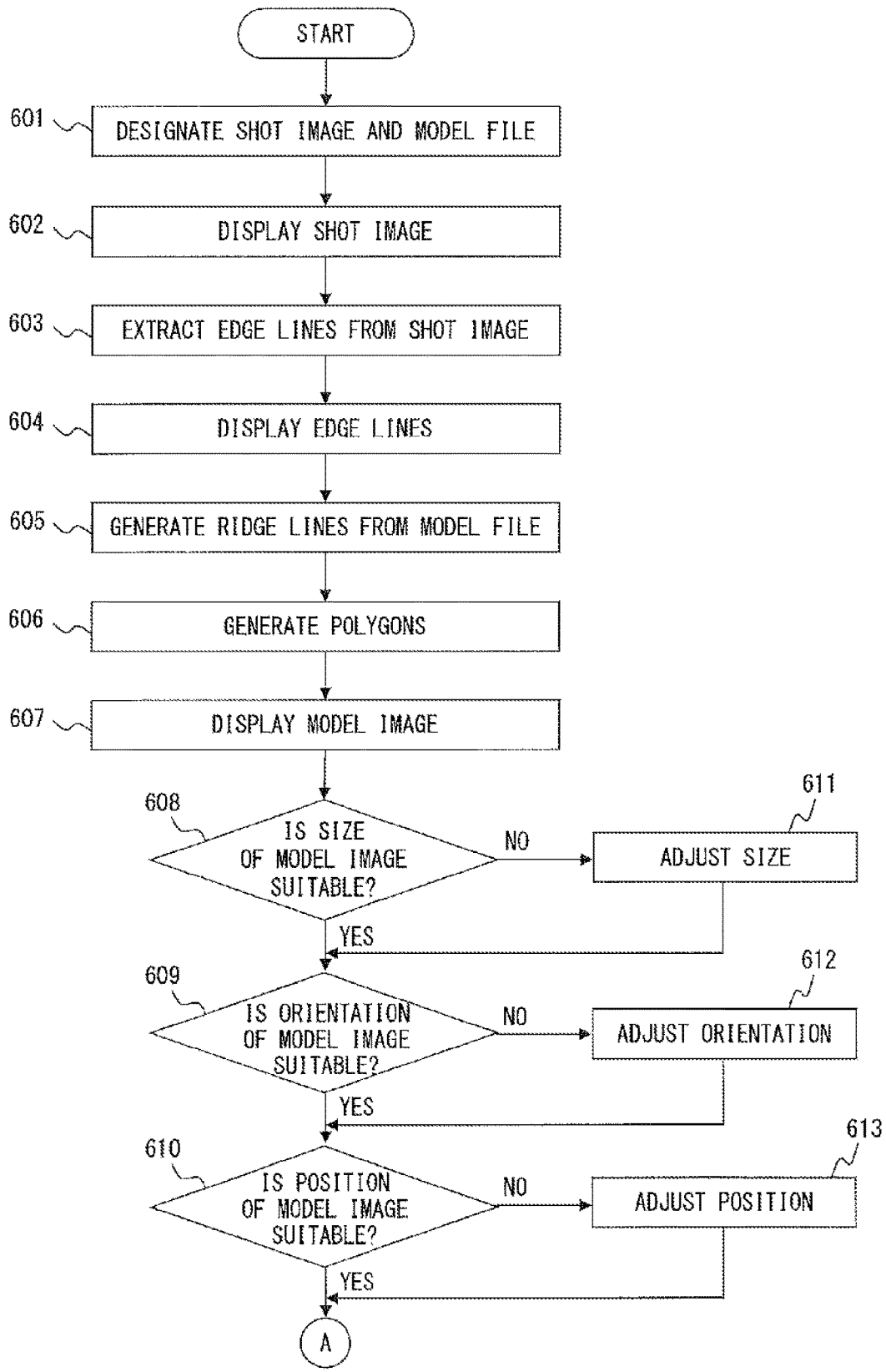
FIG. 6A is a flowchart illustrating a specific example of a superimposed display process (part 1)
Figure 6B:
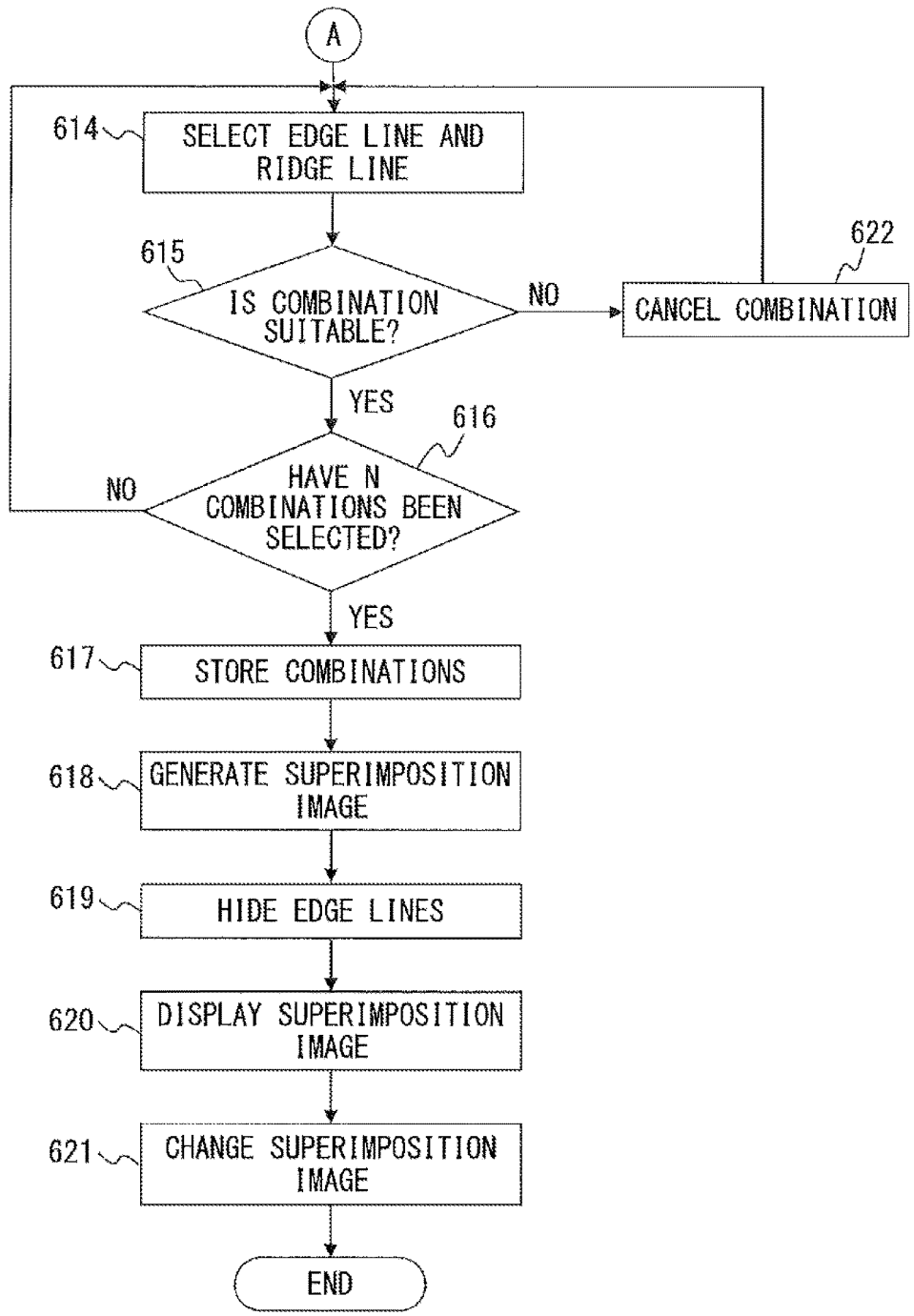
FIG. 6B is a flowchart illustrating a specific example of a superimposed display process (part 2)

FIGS. 6A and 6B are flowcharts illustrating a specific example of a superimposed display process performed by the superimposed display apparatus 501 in FIG. 5. An operator inputs an instruction for designating a shot image 521 and a model file 522, and the accepting unit 511 accepts the input instruction (step 601). The display unit 513 displays the shot image 521 designated by the instruction accepted by the accepting unit 511 on a screen (step 602).

Figure 7:
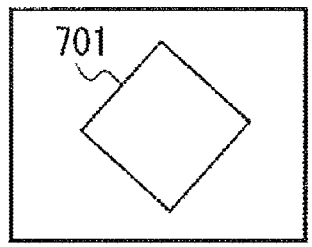
FIG. 7 illustrates a shot image.

FIG. 7 illustrates an example of a displayed shot image 521. A rectangular shot image 701 corresponds to a side surface of a cubic spatial structure.

Figure 8:
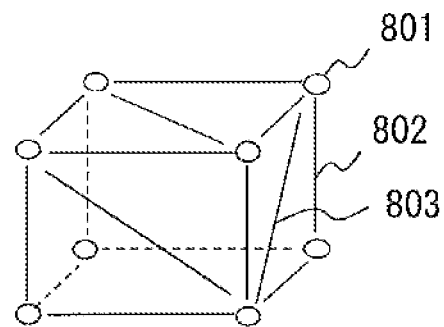
FIG. 8 illustrates model information.

FIG. 8 illustrates an exemplary three-dimensional CAD model represented by a model file 522 of the spatial structure seen in the shot image 701 in FIG. 7. Vertex information of the model file 522 includes the identification information and three-dimensional coordinates of a vertex 801 and the like of the cube; line segment information of the model file 522 includes identification information of line segments 802 and 803 and the like, and identification information indicating the two vertexes at the both ends of each line segment.

The control unit 512 performs an edge detecting process to extract edge lines from the shot image 521 (step 603), and displays the extracted edge lines on the screen (step 604). In this case, the control unit 512 may extract straight edge lines only, or may extract straight and curved edge lines.

FIG. 9 illustrates exemplary edge lines extracted from the shot image 701 in FIG. 7. Edge lines 901-904 are each extracted from a respective one of the four sides of the rectangle of the shot image 701.

Using vertex information and line segment information of the model file 522, the control unit 512 generates ridge lines of the three-dimensional CAD model (step 605). For example, the control unit 512 may extract only a line segment representing a contour feature of a three-dimensional CAD model from a plurality of line segments included in line segment information, and may use the extracted line segment as a ridge line.

Figure 10:
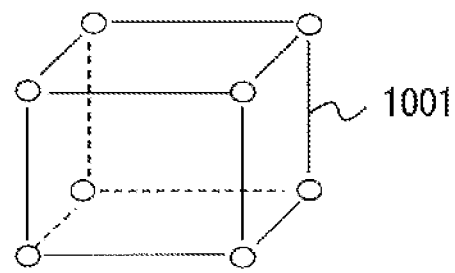
FIG. 10 illustrates ridge lines.

FIG. 10 illustrates exemplary ridge lines generated from the three-dimensional CAD model in FIG. 8. The line segment 802 in FIG. 8 corresponds to an edge of the cube and represents a contour feature, and accordingly the line segment 802 is extracted as a ridge line 1001. Meanwhile, the line segment 803 is included on a side surface of the cube and does not represent a contour feature, and accordingly the line segment 803 is not extracted as a ridge line.

The control unit 512 generates a polygon representing a surface surrounded by the generated ridge lines and stores information on the generated ridge lines and the polygon in the storage unit 514 as a model image 523 (step 606). The generated polygon represents a part of the surface of the three-dimensional CAD model.

Figure 11:
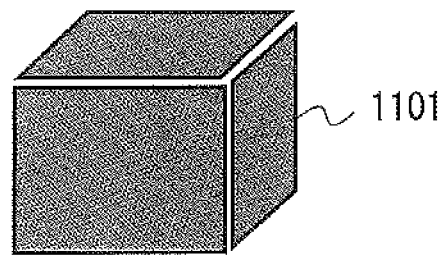
FIG. 11 illustrates polygons.

FIG. 11 illustrates exemplary polygons generated from the ridge lines in FIG. 10. A polygon 1101 represents a rectangular side face surrounded by four ridge lines corresponding to four edges of the cube.

The control unit 512 displays the model image 523 on the screen together with the shot image 521 (step 607). As a result, the edge lines extracted from the shot image 521 and the ridge lines and polygon included in the model image 523 are displayed so that the edge lines and the ridge lines can be selected on the screen. Simultaneously, the control unit 512 generates change information 526 indicating that separate change instructions are to be accepted for the shot image 521 and the model image 523, and stores the change information 526 in the storage unit 514.

Figure 12:
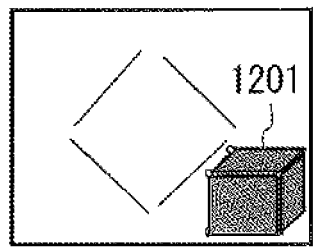
FIG. 12 illustrates a model image.

FIG. 12 illustrates an exemplary model image 523 displayed using the ridge lines in FIG. 10 and the polygons in FIG. 11. The edge lines 901-904 in FIG. 9 and a model image 1201 of the cube are displayed in this example. Displaying ridge lines and, in addition, the polygons as the model image 1201 can cover and hide the ridge lines on the back-surface side of the three-dimensional CAD model using the polygons, so that the outside shape of the three-dimensional CAD model can be readily grasped.

The operator checks whether the size of the model image 523 on the screen is suitable (step 608). When, for example, the size of the model image 523 is suitable to indicate a correlation between the edge lines of the shot image 521 and the ridge lines of the model image 523, the operator determines that the size of the model image 523 is suitable.

When the size of the model image 523 is unsuitable (NO in step 608), the operator inputs a change instruction indicating enlargement or reduction of the model image 523, and the accepting unit 511 accepts the input change instruction (step 611). Then, the control unit 512 adjusts the size of the model image 523 by enlarging or reducing the model image 523 in accordance with the change instruction. For example, the control unit 512 may enlarge or reduce the model image 523 by changing the enlargement or reduction ratio of the ridge lines and the polygons.

Figure 13:
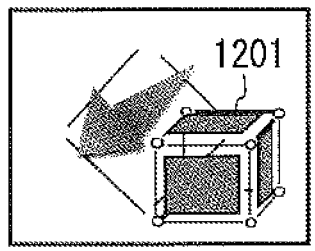
FIG. 13 illustrates adjustment of the size of a model image.

FIG. 13 illustrates an example of size adjustment of the model image 1201 depicted in FIG. 12. The model image 1201 has been enlarged in this example.

When the size of the model image 523 is suitable (YES in step 608), the operator checks whether the orientation of the model image 523 on the screen is suitable (step 609). When, for example, the orientation of the model image 523 is suitable to indicate a correlation between the edge lines of the shot image 521 and the ridge lines of the model image 523, the operator determines that the orientation of the model image 523 is suitable.

When the orientation of the model image 523 is unsuitable (NO in step 609), the operator inputs a change instruction indicating rotation of the model image 523, and the accepting unit 511 accepts the input change instruction (step 612). Then, the control unit 512 adjusts the orientation of the model image 523 by rotating the model image 523 in accordance with the change instruction. For example, the control unit 512 may rotate the model image 523 by changing the rotation angle of the ridge lines and the polygons.

Figure 14:
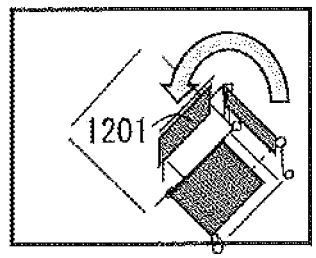
FIG. 14 illustrates adjustment of the orientation of a model image.

FIG. 14 illustrates an example of orientation adjustment of the model image 1201 depicted in FIG. 13. The model image 1201 rotates counterclockwise in this example.

When the orientation of the model image 523 is suitable (YES in step 609), the operator checks whether the position of the model image 523 on the screen is suitable (step 610). When, for example, the position of the model image 523 is suitable to indicate a correlation between the edge lines of the shot image 521 and the ridge lines of the model image 523, the operator determines that the position of the model image 523 is suitable.

When the orientation of the model image 523 is unsuitable (NO in step 610), the operator inputs a change instruction indicating movement of the model image 523, and the accepting unit 511 accepts the input change instruction (step 613). Then, the control unit 512 adjusts the position of the model image 523 by moving the model image 523 in accordance with the change instruction. For example, the control unit 512 may move the model image 523 by changing the positions of the ridge lines and the polygons.

Figure 15:
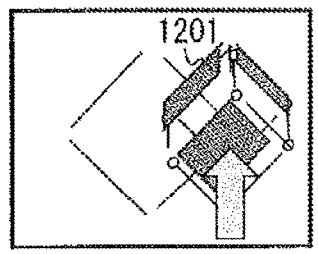
FIG. 15 illustrates adjustment of the position of a model image.

FIG. 15 illustrates an example of position adjustment of the model image 1201 depicted in FIG. 14. The model image 1201 has moved upward in this example.

When the position of the model image 523 is suitable (YES in step 610), the operator inputs a selection instruction indicating an edge line and a ridge line to serve as reference positions for superimposed display, and the accepting unit 511 accepts the input selection instruction (step 614). Then, the control unit 512 highlights the edge line and the ridge line indicated by the selection instruction by changing, for example, the color, width, or type of the edge line and the ridge line. Highlighting the edge line and the ridge line allows the operator to readily check the selection result.

The control unit 512 may display a line segment linking the edge line and the ridge line. Displaying a line segment linking the edge line and the ridge line further improves the efficiency of a task of checking the selection result that is performed by the operator.

Figure 16:
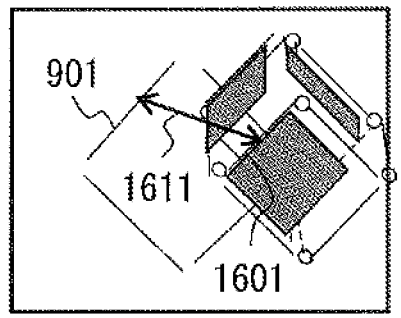
FIG. 16 illustrates selected edge lines and ridge lines.

FIG. 16 illustrates an exemplary edge line and ridge line selected on the screen depicted in FIG. 15. In this example, an edge line 901 and a ridge line 1601 have been selected, and a line segment 1611 linking the edge line 901 and the ridge line 1601 is displayed.

The operator checks whether a combination of a highlighted edge line and ridge line is suitable (step 615). When, for example, the highlighted edge line and ridge line correspond to the same ridge line of the spatial structure, the operator determines that the combination is suitable.

When the combination is unsuitable (NO in step 615), the operator gives an instruction to cancel the combination of the selected lines, and the accepting unit 511 accepts the input instruction (step 622). Then, the control unit 512 cancels the highlighting of the edge line and the ridge line. Simultaneously, the control unit 512 hides the line segment linking the edge line and the ridge line.

Figure 17:
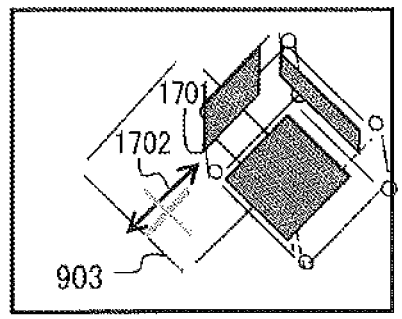
FIG. 17 illustrates an edge line and a ridge line after cancellation.

FIG. 17 illustrates examples of an edge line and ridge line after cancellation. In this example, a combination of a selected edge line 903 and ridge line 1701 has been cancelled, and a line segment 1702 linking the edge line 903 and the ridge line 1701 has been hidden.

The operator repeats the operations of step 614 and the following steps, and, when a combination is suitable (YES in step 615), the operator checks whether N combinations of lines of the overlay target have been selected (step 616). N is an integer that is 1 or greater. As N becomes a lower value, a task time of an operator is shortened, but the accuracy of the superimposed display decreases. Meanwhile, as N becomes a higher value, a task time of an operator is lengthened, but the accuracy of the superimposed display increases. N may be any of 1 to 4.

When N combinations have not been selected (NO in step 616), the operator repeats the operations of step 614 and the following steps; when N combinations have been selected (YES in step 616), the operator inputs a superimposition instruction (step 617). The accepting unit 511 accepts the input superimposition instruction. The control unit 512 generates and stores combination information 524 indicating the selected N combinations in the storage unit 514.

FIG. 18 illustrates four exemplary combinations of an edge line and a ridge line. In this example, a combination of an edge line 901 and a ridge line 1601, a combination of an edge line 902 and a ridge line 1602, a combination of an edge line 903 and a ridge line 1603, and a combination of an edge line 904 and a ridge line 1604 have been selected. In addition, a line segment 1611 linking the edge line 901 and the ridge line 1601, a line segment 1612 linking the edge line 902 and the ridge line 1602, a line segment 1613 linking the edge line 903 and the ridge line 1603, and a line segment 1614 linking the edge line 904 and the ridge line 1604 have been displayed.

FIG. 19 illustrates an example of combination information 524. Each entry of combination information 524 of FIG. 19 includes an edge line ID, a ridge line ID, and a priority. An edge ID is identification information of an edge line included in a combination, a ridge line ID is identification information of a ridge line included in the combination, and a priority indicates the degree of priority of the combination that is determined according to a prescribed standard.

For example, an order in which a combination of an edge line and a ridge line is selected by the operator may be directly used as a priority, or a higher priority may be given to combinations with more reliable ridge lines. For example, among the ridge lines of components of a spatial structure, the reliability levels of ridge lines with a high processing accuracy or assembling accuracy may become high, and the reliability levels of ridge lines with a low processing accuracy or assembling accuracy may become low. In this case, information indicating the reliability of each line segment is added to line segment information of the model file 522, and the control unit 512 determines priorities for combinations by referring to the reliabilities of selected ridge lines.

E1 to E4 represent the edge line IDs of the edge lines 901 to 904 in FIG. 18; L1 to L4, the ridge line IDs of the ridge lines 1601 to 1604. A combination of E1 and L1 has the highest priority, and a combination of E4 and L4 has the lowest priority.

The control unit 512 generates a superimposition image 525 in which a model image 523 has been superimposed onto a shot image 521 in a manner such that an edge line and a ridge line included in each combination in combination information 524 overlap each other, and stores the superimposition image 525 in the storage unit 514 (step 618). For example, the control unit 512 may superimpose the model image 523 onto the shot image 521 by adjusting the enlargement or reduction ratio, rotation angle, and position of ridge lines and polygons of the model image 523.

When N is 2 or greater, it is rare for all of the plurality combinations to include an edge line and a ridge line that coincide with each other. In this case, the control unit 512 calculates optimum values for the enlargement or reduction ratio, rotation angle, and position of the ridge lines and polygons, thereby generating a superimposition image 525 with the edge lines and the ridged lines moderately coinciding with each other.

The control unit 512 cancels highlighting of the edge lines and the ridge lines and hides the edge lines (step 619). Simultaneously, the control unit 512 also hides line segments linking the edge lines and the ridge lines.

The control unit 512 displays the superimposition image 525 on the screen (step 620). The control unit 512 may change, for example, the color, width, and type of an edge line and a ridge line included in each combination in combination information 524, thereby highlighting the edge line and the ridge line. Highlighting the edge line and the ridge line allows the operator to readily check the edge line and the ridge line that have been overlaid in superimposed display. The control unit 512 switches the change information 526 in the storage unit 514 to information indicating that a common change instruction is to be accepted for the shot image 521 and the model image 523.

Figure 20:
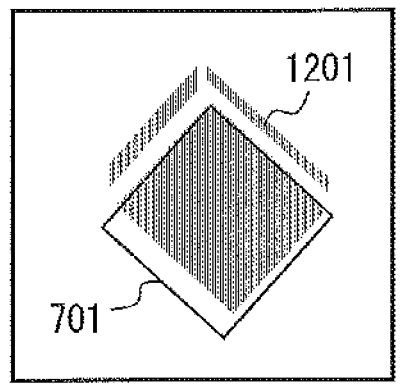
FIG. 20 illustrates a superimposition image.

FIG. 20 illustrates an exemplary superimposition image 525 in which the model image 1201 in FIG. 12 has been superimposed onto the shot image 701 in FIG. 7.

The operator looks at the superimposition image 525 on the screen so as to check misalignments between the shot image 521 and the model image 523. To check a misalignment the operator wishes to check, the operator inputs a change instruction for the superimposition image 525, and, in accordance with change information 526, the accepting unit 511 accepts the input change instruction as a common instruction for the shot image 521 and the model image 523 (step 621). The control unit 512 adjusts the size, orientation, or position of the superimposition image 525 by enlarging, reducing, rotating, or moving the entirety of the superimposition image 525 in accordance with the change instruction.

In such a superimposed display process, simply selecting an edge line and a ridge line respectively from a shot image 521 and a model image 523 displayed on one screen automatically displays a superimposition image 525 in which the selected edge line and ridge line overlap each other. Accordingly, a misalignment between the shot image 521 of a spatial structure and the model image 523 of a three-dimensional CAD model of that structure can be instantly checked, thereby improving the efficiency of a checking task of comparing the spatial structure and the three-dimensional CAD model. Moreover, even unskilled operators can conduct a precise diagnosis in a short time.

Figure 21:
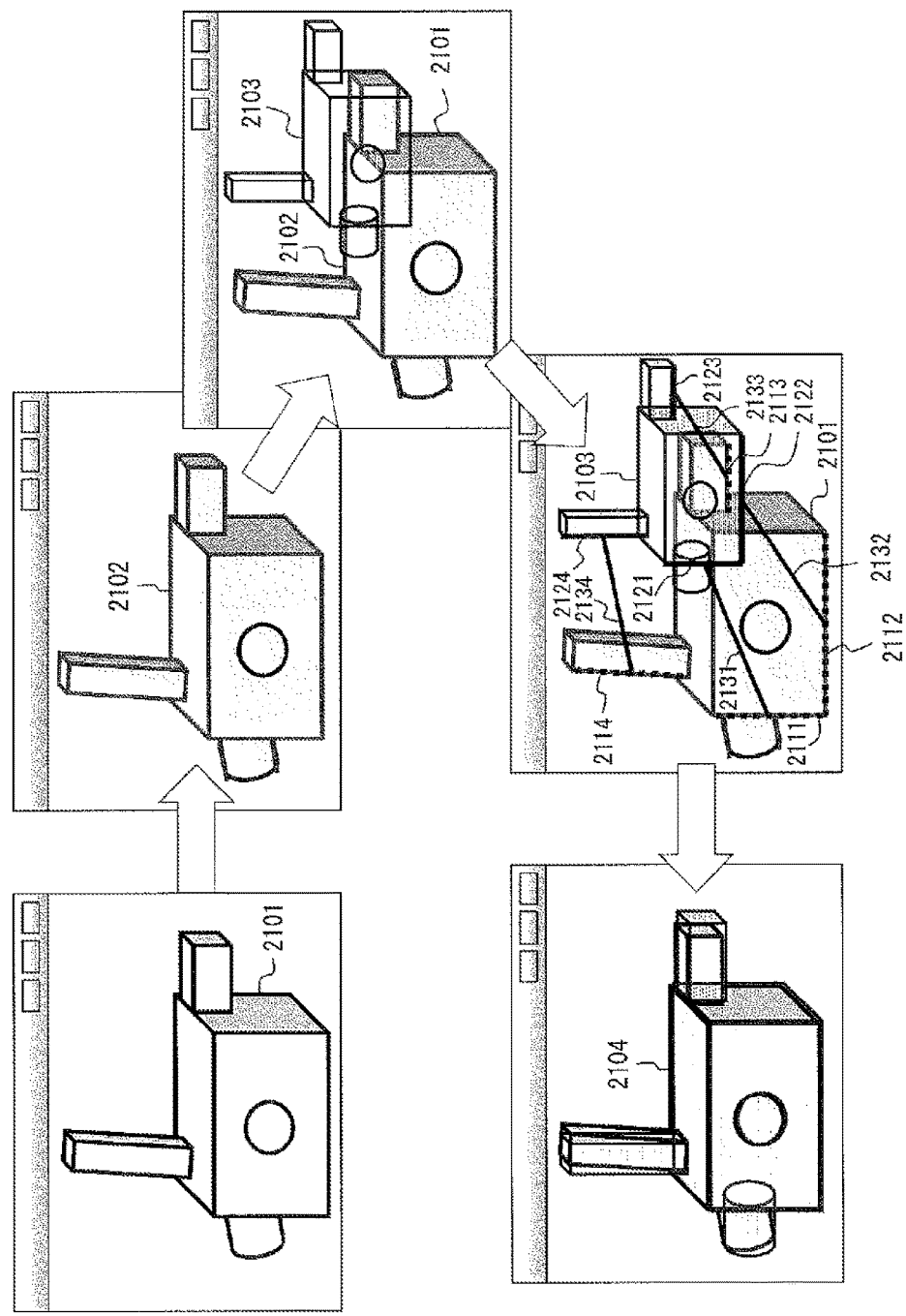
FIG. 21 illustrates a superimposed display process.

FIG. 21 illustrates an exemplary superimposed display process on another shot image 521. First, an edge line 2102 is extracted from a shot image 2101 of a spatial structure in an edge detecting process, and a model image 2103 generated from a three-dimensional CAD model of the spatial structure is displayed together with the shot image 2101 and the edge line 2102.

Next, a combination of an edge line 2111 of the shot image 2101 and a ridge line 2121 of the model image 2103 is highlighted in accordance with a selection instruction input by an operator. In addition, a combination of an edge line 2112 and a ridge line 2122, a combination of an edge line 2113 and a ridge line 2123, and a combination of an edge line 2114 and a ridge line 2124 are highlighted. A line segment 2131 linking the edge line 2111 and the ridge line 2121, a line segment 2132 linking the edge line 2112 and the ridge line 2122, a line segment 2133 linking the edge line 2113 and the ridge line 2123, and a line segment 2134 linking the edge line 2114 and the ridge line 2124 are displayed.

After those four combinations are selected, a superimposition image 2104 is displayed in which the model image 2103 has been superimposed onto the shot image 2101 in a manner such that the edge lines 2111-2114 respectively overlap the ridge lines 2121-2124.

Figure 22:
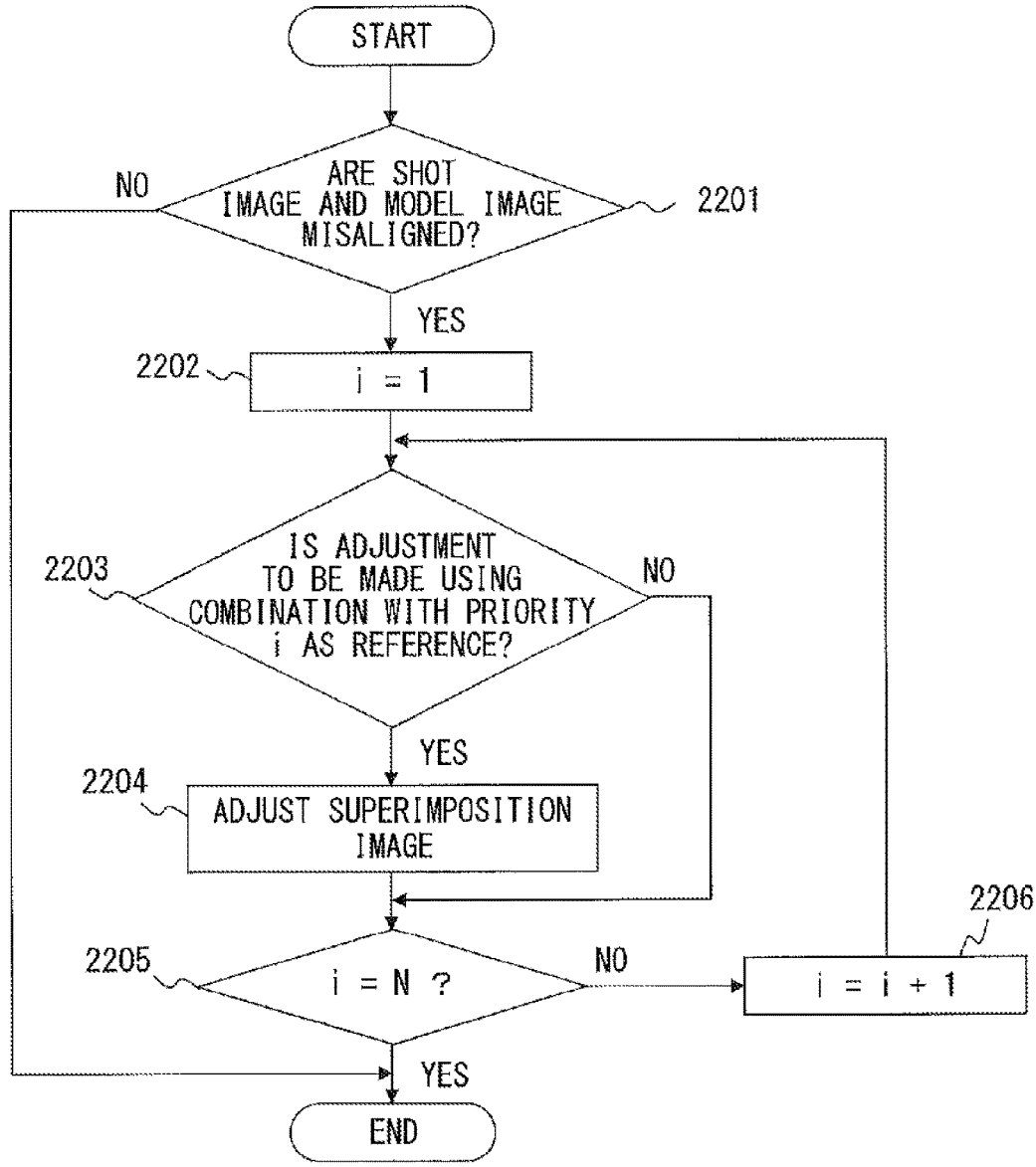
FIG. 22 is a flowchart of an adjusting process.

FIG. 22 is a flowchart illustrating an exemplary adjusting process performed after the superimposed display process in FIG. 6B is performed. In the adjusting process, the size, orientation, or position of a shot image 521 or model image 523 included in a superimposition image 525 is adjusted according to priorities included in combination information 524.

An operator looks at the superimposition image 525 on the screen so as to check whether the shot image 521 and the model image 523 are misaligned (step 2201). When the shot image 521 and the model image 523 are aligned (NO in step 2201), the operator ends the checking task.

When the shot image 521 and the model image 523 are misaligned (YES in step 2201), the operator inputs an adjustment instruction for the superimposition image 525, and the accepting unit 511 accepts the input adjustment instruction. In accordance with the adjustment instruction, the control unit 512 sets 1 as control variable i, which indicates priority (step 2202).

The control unit 512 selects an entry with priority i in combination information 524, obtains an edge line ID and a ridge line ID from the selected entry, and highlights an edge line and ridge line indicated by the obtained edge line ID and ridge line ID (step 2203). The operator determines whether to make an adjustment using a combination of the highlighted edge line and ridge line as a reference.

In making an adjustment using the combination of the highlighted edge line and ridge line as a reference (YES in step 2203), the operator inputs an execution instruction, and the accepting unit 511 accepts the input execution instruction. In accordance with the execution instruction, the control unit 512 adjusts the superimposition image 525 by enlarging, reducing, rotating, or moving the model image 523 in a manner such that the highlighted edge line and ridge line coincide with each other (step 2204).

The control unit 512 checks whether i has reached N (step 2205). When i has not reached N (NO in step 2205), the control unit 512 increments i by one (step 2206), and repeats the processes of step 2203 and the following steps. When i has reached N (YES in step 2205), the control unit 512 ends the process.

When the shot image 521 and the model image 523 are misaligned, such an adjusting process allows the misalignment between the shot image 521 and the model image 523 to be checked in detail while changing reference positions on the shot image 521 and the model image 523.

Figure 23:
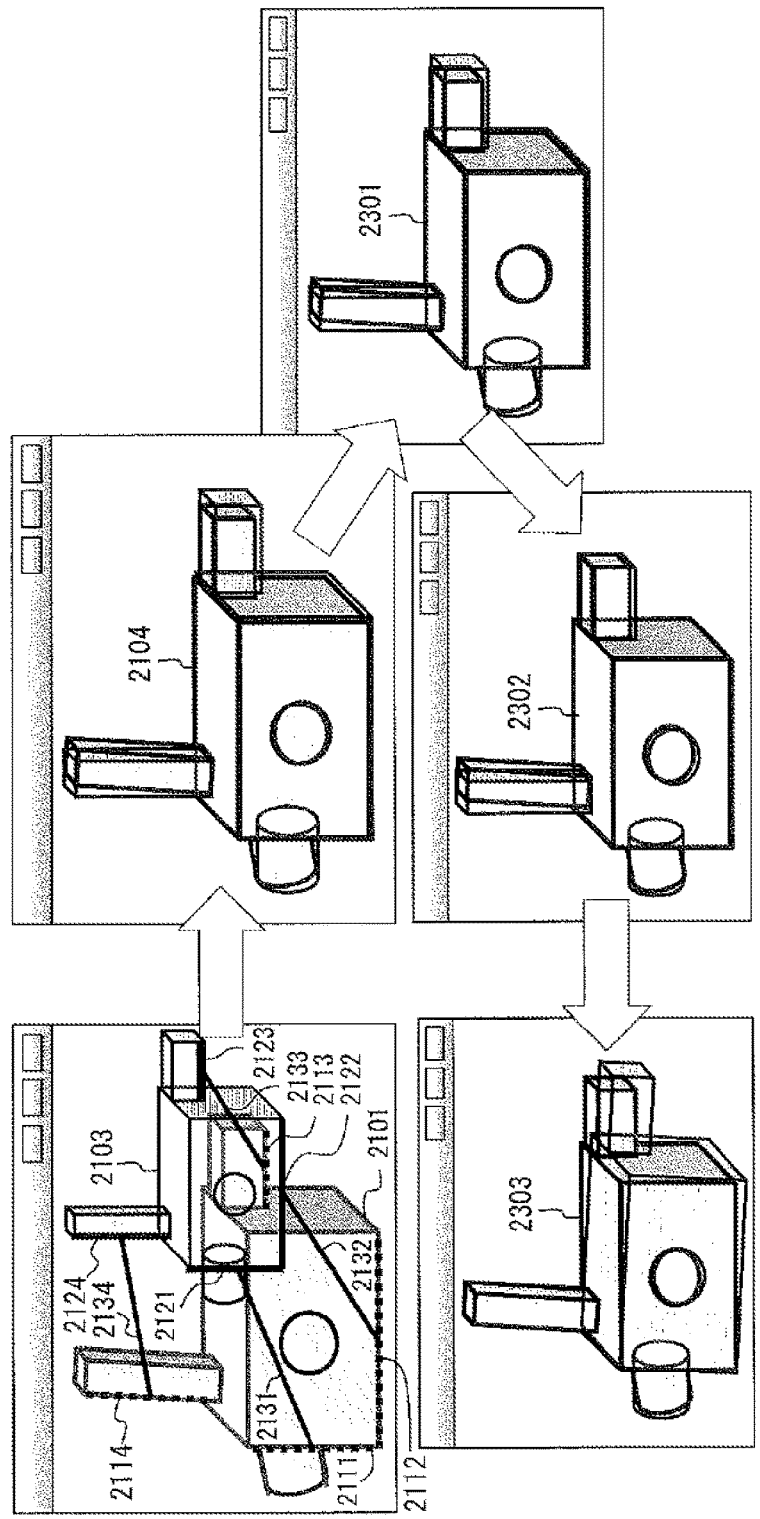
FIG. 23 illustrates an adjusting process.

FIG. 23 illustrates an exemplary adjusting process on the superimposition image 2104 in FIG. 21. In this case, the priorities of combinations of an edge line and a ridge line are as follows.

Priority 1: Edge line 2111 and ridge line 2121
Priority 2: Edge line 2112 and ridge line 2122
Priority 3: Edge line 2113 and ridge line 2123
Priority 4: Edge line 2114 and ridge line 2124

After a superimposition image 2104 has been displayed in which a model image 2103 has been superimposed onto a shot image 2101, when an operator designates a combination with priority 1 or 2 as a reference, the superimposition image 2104 is replaced with a superimposition image 2301 on the screen. When a combination with priority 1 is designated, the superimposition image 2301, in which the edge line 2111 and the ridge line 2121 coincide with each other, is displayed; when a combination with priority 2 is designated, the superimposition image 2301, in which the edge line 2112 and the ridge line 2122 coincide with each other, is displayed.

When the operator designates a combination with priority 3 as a reference, the superimposition image 2301 is replaced with a superimposition image 2302 on the screen. In this case, the superimposition image 2302, in which the edge line 2113 and the ridge line 2123 coincide with each other, is displayed.

When the operator designates a combination with priority 4 as a reference, the superimposition image 2302 is replaced with a superimposition image 2303 on the screen. In this case, the superimposition image 2303, in which the edge line 2114 and the ridge line 2124 coincide with each other, is displayed.

The configurations of the superimposed display apparatus 101 in FIG. 1, the superimposed display apparatus 301 in FIG. 3, and the superimposed display apparatus 501 in FIG. 5 are merely examples, and some components may be omitted or changed according to the intended use or conditions of the superimposed display apparatuses. For example, when the method of accepting a change instruction is not switched, change information 526 in FIG. 5 may be omitted; when the operator does not input a selection instruction indicating an edge line and a ridge line of an overlay target, combination information 524 may be omitted.

The flowcharts of FIGS. 2, 4, 6A, 6B, and 22 are merely examples, and some processes may be omitted or changed according to the configuration or conditions of the superimposed display apparatus. For example, when polygons of the model image 523 do not need to be displayed in the superimposed display processes in FIGS. 6A and 6B, the process of step 606 may be omitted. When the size, orientation, and position of the model image 523 do not need to be adjusted, the processes of steps 608-613 may be omitted.

When a check does not need to be made as to whether a combination of a selected edge line and ridge line is suitable, the processes of steps 615 and 622 may be omitted. When the superimposition image 525 does not need to be changed on the screen, the process of step 621 may be omitted. When the operator does not input a selection instruction indicating an edge line and a ridge line of an overlay target, the processes of steps 608-617 may be omitted.

A set of steps 602-604 and a set of steps 605-607 may be performed in reverse order. Insteps 614 and 620, the control unit 512 does not always need to highlight a selected edge line and ridge line.

The shot images, model information, edge lines, ridge lines, polygons, model images, superimposition images, and combination information in FIGS. 7-21 and 23 are merely examples, and other images or other pieces of information may be used.

Figure 24:
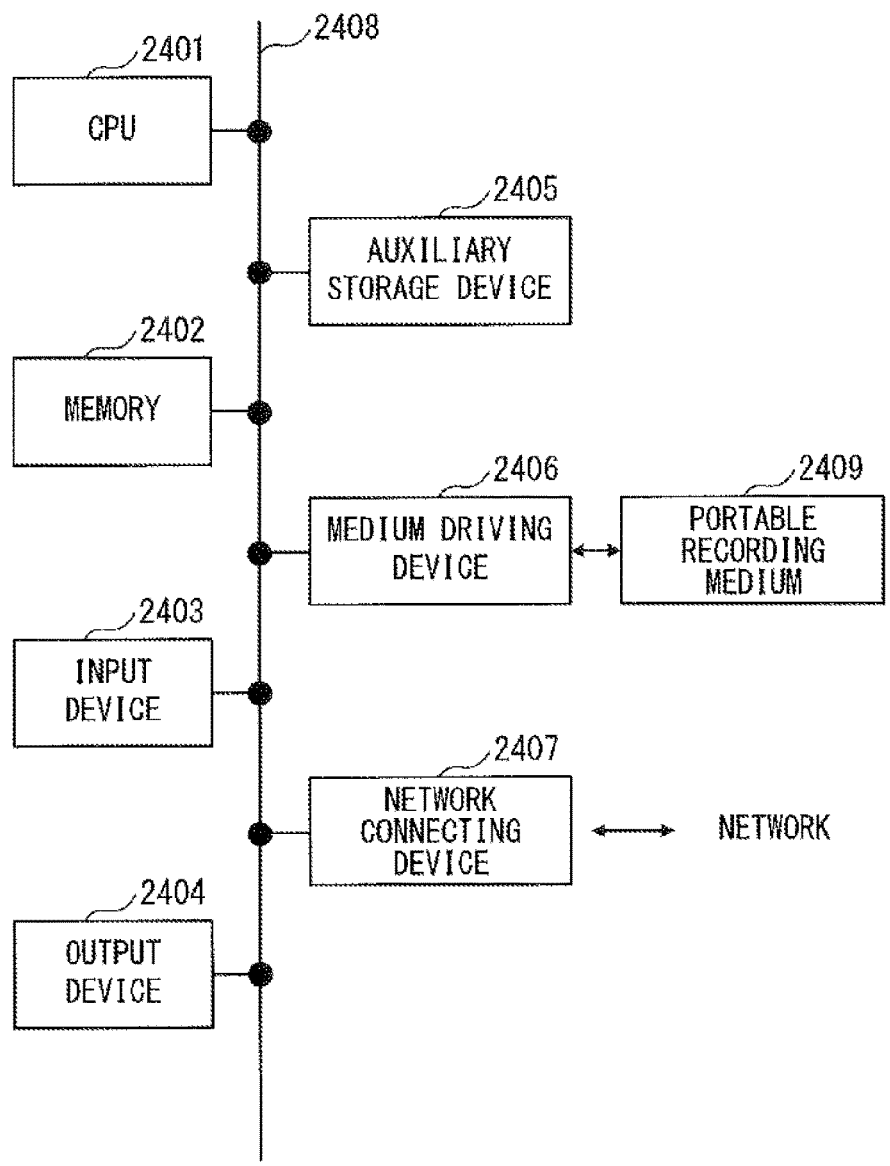
FIG. 24 is a configuration diagram of an information processing apparatus.

The superimposed display apparatus 101 in FIG. 1, the superimposed display apparatus 301 in FIG. 3, and the superimposed display apparatus 501 in FIG. 5 can be implemented using, for example, an information processing apparatus (computer) such as that depicted in FIG. 24. The information processing apparatus in FIG. 24 includes a Central Processing Unit (CPU) 2401, a memory 2402, an input device 2403, an output device 2404, an auxiliary storage device 2405, a medium driving device 2406, and a network connecting device 2407. These elements are connected to each other by a bus 2408.

The memory 2402 is, for example, a semiconductor memory such as a Read Only Memory (ROM), a Random Access Memory (RAM), or a flash memory, and stores programs and data for use in processing. The memory 2402 may be used as the storage unit 514 in FIG. 5.

The CPU 2401 (processor) operates as the control unit 313 in FIG. 3 and the control unit 512 in FIG. 5 by, for example, executing a program using the memory 2402.

The input device 2403 is, for example, a keyboard or a pointing device and is used to input an instruction or information from an operator. The input device 2403 may be used as the accepting unit 112 in FIG. 1, the accepting unit 312 in FIG. 3, and the accepting unit 511 in FIG. 5.

The output device 2404 is, for example, a display device, a printer, or a speaker, and is used to output a query or a processing result to the operator. The processing result may be a superimposition image 525. The output device 2404 may be used as the display unit 111 in FIG. 1, the display unit 311 in FIG. 3, and the display unit 513 in FIG. 5.

The auxiliary storage device 2405 is, for example, a magnetic disk device, an optical disk device, a magneto-optical disk device, or a tape device. The auxiliary storage device 2405 may be a hard disk drive or a flash memory. The information processing apparatus may store a program and data in the auxiliary storage device 2405 and load them into the memory 2402 for use. The auxiliary storage device 2405 may be used as the storage unit 514 in FIG. 5.

The medium driving device 2406 drives a portable recording medium 2409 and accesses items recorded therein. The portable recording medium 2409 is, for example, a memory device, a flexible disk, an optical disk, or a magneto-optical disk. The portable recording medium 2409 may be, for example, a Compact Disk Read Only Memory (CD-ROM), a Digital Versatile Disk (DVD), or a Universal Serial Bus (USB) memory. The operator may store a program and data in the portable recording medium 2409 and load them into the memory 2402 for use.

As described above, a computer-readable recording medium that stores a program and data to be used for processing is a physical (non-transitory) recording medium such as the memory 2402, the auxiliary storage apparatus 2405, or the portable recording medium 2409.

The network connecting device 2407 is a communication interface that is connected to a communication network such as a Local Area Network or a Wide Area Network and that performs data conversion associated with a communication. The information processing apparatus may receive a program and data from an external apparatus via the network connecting device 2407 and load them into the memory 2402 for use.

The information processing apparatus does not need to include all of the elements in FIG. 24, and one or more of the elements may be omitted according to the intended use or conditions. For example, the network connecting device 2407 may be omitted when a communication does not need to be performed with another apparatus; the medium driving device 2406 may be omitted when the portable recording medium 2409 is not used.

When the information processing apparatus is a portable terminal apparatus with a call function, the information processing apparatus may include a call apparatus such as a microphone or a speaker, or may include an image shooting apparatus such as a camera.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A superimposed display method comprising:
   displaying, by a computer, a plurality of edge lines extracted from a shot image of a spatial structure that has been shot by an image shooting apparatus, and a plurality of ridge lines included in a model image represented by model information of the spatial structure, in a manner such that the edge lines and the ridge lines are selectable by an operator through an input device;
   accepting, by the computer, a selection instruction that selects an edge line of a first overlay target, and a ridge line of a second overlay target that is to be overlaid on the edge line, for each of a prescribed number of combinations of the first overlay target and the second overlay target, the selection instruction being input to the computer by the operator through the input device for each of the prescribed number of combinations; and
   in accordance with the selection instruction, displaying, by the computer, a superimposition image in which the model image has been superimposed onto the shot image in a manner such that the edge line selected by the selection instruction for each of the prescribed number of combinations and the ridge line selected by the selection instruction for each of the prescribed number of combinations overlap each other.

2. The superimposed display method according to claim 1, wherein
   the selection instruction includes a priority for each of the prescribed number of combinations, and
   the displaying the superimposition image sequentially selects the prescribed number of combinations one by one in accordance with the priority, and superimposes the model image onto the shot image in a manner such that an edge line and a ridge line included in each selected combination overlap each other.

3. The superimposed display method according to claim 1, further comprising:
   in accordance with the selection instruction, displaying a line segment linking the edge line of the first overlay target and the ridge line of the second overlay target before displaying the superimposition image.

4. The superimposed display method according to claim 1, further comprising:
   in accordance with the selection instruction, highlighting the edge line of the first overlay target and the ridge line of the second overlay target before displaying the superimposition image.

5. The superimposed display method according to claim 4, further comprising:

cancelling the highlighting of the edge line of the first overlay target and the ridge line of the second overlay target when displaying the superimposition image.

6. The superimposed display method according to claim 1, further comprising:
highlighting the edge line of the first overlay target and the ridge line of the second overlay target when displaying the superimposition image.

7. A superimposed display apparatus comprising:
a memory; and
a processor operatively coupled to the memory and the processor configured to:
display a plurality of edge lines extracted from a shot image of a spatial structure that has been shot by an image shooting apparatus, and a plurality of ridge lines included in a model image represented by model information of the spatial structure, in a manner such that the edge lines and the ridge lines are selectable by an operator through an input device;
accept a selection instruction that selects an edge line of a first overlay target, and a ridge line of a second overlay target that is to be overlaid on the edge line, for each of a prescribed number of combinations of the first overlay target and the second overlay target, the selection instruction being input to the processor by the operator through the input device for each of the prescribed number of combinations; and
in accordance with the selection instruction, display a superimposition image in which the model image has been superimposed onto the shot image in a manner such that the edge line selected by the selection instruction for each of the prescribed number of combinations and the ridge line selected by the selection instruction for each of the prescribed number of combinations overlap each other.

8. A non-transitory computer-readable recording medium having stored therein a superimposed display program that causes a computer to execute a process comprising:
displaying a plurality of edge lines extracted from a shot image of a spatial structure that has been shot by an image shooting apparatus, and a plurality of ridge lines included in a model image represented by model information of the spatial structure, in a manner such that the edge lines and the ridge lines are selectable by an operator through an input device;
accepting a selection instruction that selects an edge line of a first overlay target, and a ridge line of a second overlay target that is to be overlaid on the edge line, for each of a prescribed number of combinations of the first overlay target and the second overlay target, the selection instruction being input to the computer by the operator through the input device for each of the prescribed number of combinations; and
in accordance with the selection instruction, displaying a superimposition image in which the model image has been superimposed onto the shot image in a manner such that the edge line selected by the selection instruction for each of the prescribed number of combinations and the ridge line selected by the selection instruction for each of the prescribed number of combinations overlap each other.

* * * * *